(12) United States Patent
Pecina

(10) Patent No.: US 12,253,477 B2
(45) Date of Patent: Mar. 18, 2025

(54) STANDARDS FOR NON-DESTRUCTIVE TESTING METHODOLOGIES AND METHODS OF FABRICATING THE STANDARDS

(71) Applicant: The Boeing Company, Chicago, IL (US)

(72) Inventor: Joseph Pecina, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 330 days.

(21) Appl. No.: 17/704,452

(22) Filed: Mar. 25, 2022

(65) Prior Publication Data

US 2023/0324313 A1 Oct. 12, 2023

(51) Int. Cl.
*G01N 22/02* (2006.01)
*G01N 29/04* (2006.01)

(52) U.S. Cl.
CPC ........... *G01N 22/02* (2013.01); *G01N 29/043* (2013.01); *G01N 29/048* (2013.01)

(58) Field of Classification Search
None
See application file for complete search history.

(56) References Cited

U.S. PATENT DOCUMENTS

| | | | |
|---|---|---|---|
| 7,617,714 B2* | 11/2009 | Engelbart | B33Y 50/02 73/1.03 |
| 7,617,715 B2* | 11/2009 | Georgeson | G01N 29/30 29/593 |
| 2013/0071603 A1* | 3/2013 | Watson | B32B 3/04 428/218 |
| 2016/0139016 A1* | 5/2016 | Kismarton | G06F 30/00 73/818 |

* cited by examiner

*Primary Examiner* — Patrick Assouad
*Assistant Examiner* — Mark A Shabman
(74) *Attorney, Agent, or Firm* — Kolitch Romano Dascenzo Gates LLC

(57) ABSTRACT

Standards for non-destructive testing methodologies and methods of fabricating the standards are disclosed herein. The standards include a void-defect coupon that includes a spheroidal void and an elongated void. The spheroidal void has a maximum dimension and a spheroidal void volume. The elongated void had a longitudinal dimension, a maximum transverse dimension, and an elongated void volume. The longitudinal dimension of the elongated void is greater than the maximum dimension of the spheroidal void. The maximum transverse dimension of the elongated void is less than the maximum dimension of the spheroidal void. The methods include forming a first void-defect coupon and forming a second void-defect coupon.

20 Claims, 2 Drawing Sheets

STANDARDS FOR NON-DESTRUCTIVE TESTING METHODOLOGIES AND METHODS OF FABRICATING THE STANDARDS

FIELD

The present disclosure relates generally to standards for non-destructive testing methodologies and/or to methods of fabricating the standards.

BACKGROUND

Non-destructive testing methodologies may be utilized to inspect and/or to test a structure without damage to the structure. As such, non-destructive testing methodologies may be valuable for inspection of manufactured components during and/or subsequent to fabrication of the manufactured components. As examples, non-destructive testing methodologies may be utilized to detect and/or to quantify defects in the manufactured component, thereby permitting validation of a manufacturing process and/or ensuring that any defects in the manufactured component, if present, are at an acceptable level.

A variety of non-destructive testing methodologies exist; however, a given non-destructive testing methodology generally is sensitive only to certain types, or classes, of defects. In addition, a size, shape, and/or distribution of the defects, as well as a size, shape, and/or material of the manufactured component, all impact a given non-destructive testing methodology's ability to detect a given defect. In certain industries, it may be beneficial to understand and/or to quantify a given non-destructive testing methodology's ability to detect a given defect within a given manufactured component. Thus, there exists a need for improved standards for non-destructive testing methodologies and/or for methods of fabricating the standards.

SUMMARY

Standards for non-destructive testing methodologies and methods of fabricating the standards are disclosed herein. The standards include a void-defect coupon that includes a spheroidal void and an elongated void. The spheroidal void has a maximum dimension and a spheroidal void volume. The elongated void has a longitudinal dimension, a maximum transverse dimension, and an elongated void volume. The longitudinal dimension of the elongated void is greater than the maximum dimension of the spheroidal void. The maximum transverse dimension of the elongated void is less than the maximum dimension of the spheroidal void. The methods include forming a first void-defect coupon, which includes a first-coupon void having a maximum dimension and a volume, utilizing a first powder metallurgy process. The methods also include forming a second void-defect coupon, which has a second-coupon void having a maximum dimension that is greater than the maximum dimension of the first-coupon void and/or a volume that is greater than the volume of the first-coupon void, utilizing a second powder metallurgy process.

DESCRIPTION

Figure 1:
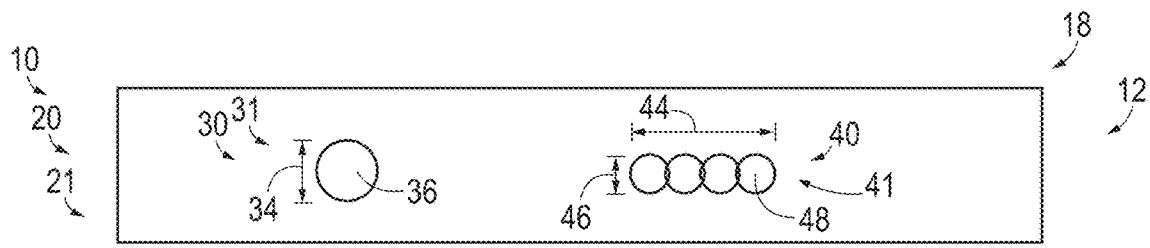
FIG. 1 is a schematic illustration of an example of a, or a first, void-defect coupon that may form a portion of a standard for evaluating non-destructive testing methodologies and fatigue durability performance, according to the present disclosure.

FIGS. 1-7 provide illustrative, non-exclusive examples of standards 10, coupons 18, manufactured components 100, and/or methods 300, according to the present disclosure. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

As discussed, non-destructive testing methodologies, while effective in certain circumstances, may be ineffective at detecting certain types, or classes, of defects. Additionally or alternatively, and as also discussed, a size, shape, and/or material of a manufactured component 100 may, in some circumstances, impact sensitivity of a given non-destructive testing methodology to a given defect type, size, shape, and/or distribution. With this in mind, standards 10, which are disclosed herein, may be utilized to assess and/or to quantify the sensitivity of a given non-destructive testing methodology to a given defect type and may, in some examples, also be utilized to assess and/or quantify the sensitivity of the given non-destructive testing methodology for a given shape of a given manufactured component.

This may be accomplished by producing standards 10 that have known defect types, sizes, and/or distributions. Additionally or alternatively, this also may be accomplished by forming standards 10 in shapes that correspond to the shape of given manufactured components 100. Stated differently, standards 10, which are disclosed herein, may permit classification and/or quantification of the sensitivity of the given non-destructive testing methodology, both to a given type of defect and to that given type of defect when present in a manufactured component 100 with a given shape. As such, standards 10 may permit and/or facilitate selection of appropriate non-destructive testing methodologies for a given manufacturing process that is utilized to produce and/or to generate a given manufactured component 100. Examples of non-destructive testing methodologies that may be utilized with standards 10 according to the present disclosure include visual non-destructive testing, ultrasonic non-destructive testing, radiographic non-destructive testing, eddy current non-destructive testing, magnetic particle non-destructive testing, acoustic emission non-destructive testing, dye penetrant non-destructive testing, electromagnetic non-destructive testing, magnetic flux leakage non-destructive testing, microwave non-destructive testing, thermographic non-destructive testing, and/or x-ray non-destructive testing.

Standards 10, which are disclosed herein, generally are configured to permit and/or facilitate the quantification of effectiveness of the given non-destructive testing methodology in detecting defects within manufactured components 100 formed utilizing powder metallurgy processes, which are discussed in more detail herein. However, it is within the scope of the present disclosure that the disclosed standards 10 may be utilized with any suitable non-destructive testing methodology and/or may be utilized to permit and/or to facilitate quantification of the effectiveness of the given non-destructive testing methodology for any suitable manufactured component 100.

Figure 2:
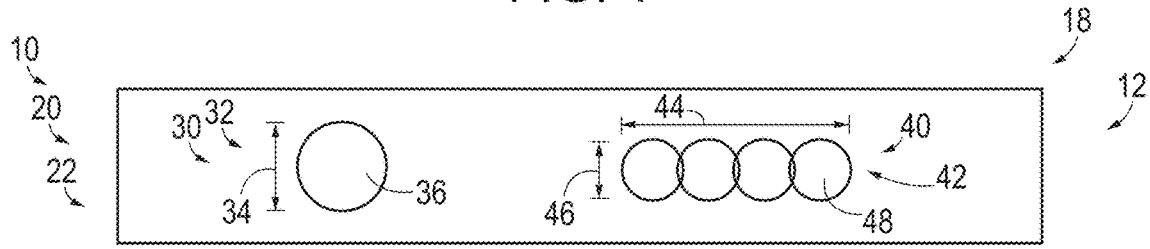
FIG. 2 is a schematic illustration of an example of a second void-defect coupon that may form a portion of a standard for evaluating non-destructive testing methodologies and fatigue durability performance, according to the present disclosure.
Figure 3:
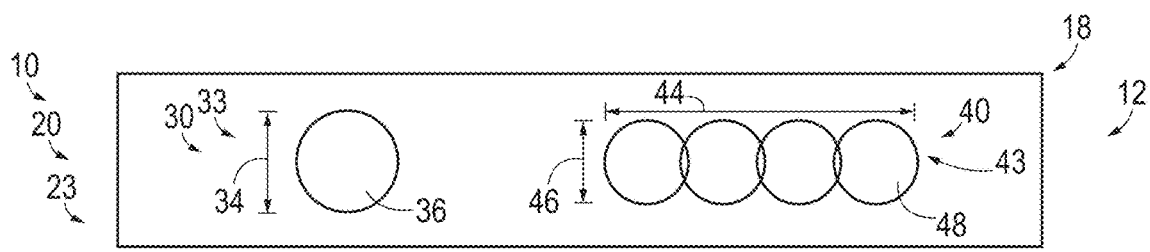
FIG. 3 is a schematic illustration of an example of a third void-defect coupon that may form a portion of a standard for evaluating non-destructive testing methodologies and fatigue durability performance, according to the present disclosure.

With the above in mind, FIGS. 1-3 are schematic illustrations of examples of coupons 18, in the form of void-defect coupons 20, that may form a portion of a standard 10 for evaluating non-destructive testing methodologies and fatigue durability performance, according to the present disclosure. FIG. 1 illustrates a void-defect coupon 20, which also may be referred to herein as and/or may be a first void-defect coupon 21. Void-defect coupon 20 of FIG. 1 includes a spheroidal void 30, which also may be referred to herein as and/or may be a first-coupon spheroidal void 31, and an elongated void 40, which also may be referred to herein as and/or may be a first-coupon elongated void 41. Spheroidal void 30 has and/or defines a maximum dimension 34 and a spheroidal void volume 36. Similarly, elongated void 40 has and/or defines a longitudinal dimension 44, which also may be referred to herein as a maximum longitudinal dimension 44 and/or as a maximum dimension 44, a maximum transverse dimension 46, and an elongated void volume 48.

As illustrated in FIG. 1, longitudinal dimension 44 of elongated void 40 is greater than maximum dimension 34 of spheroidal void 30. In addition, and as also illustrated in FIG. 1, maximum transverse dimension 46 of elongated void 40 is less than maximum dimension 34 of spheroidal void 30. When void-defect coupon 20 of FIG. 1 is utilized to quantify the sensitivity of one or more non-destructive testing methodologies to void defects, the relative size distribution between spheroidal void 30 and elongated void 40 may permit and/or facilitate deconvolution spatial, or directional, vs. volumetric sensitivity of the one or more non-destructive testing methodologies.

It is within the scope of the present disclosure that spheroidal void 30 may have and/or define any suitable size relative to elongated void 40. As an example, maximum dimension 34 of spheroidal void 30 may be a threshold maximum dimension fraction of longitudinal dimension 44 of elongated void 40. Examples of the threshold maximum dimension fraction include threshold fractions of 40%, 50%, 60%, 70%, 80%, at least 40%, at least 50%, at least 60%, at least 70%, at most 80%, at most 70%, at most 60%, and/or at most 50%.

As another example, maximum transverse dimension 46 of elongated void 40 may be a threshold transverse dimension fraction of maximum dimension 34 of spheroidal void 30. Examples of the threshold transverse dimension fraction include threshold fractions of 30%, 40%, 50%, 60%, 70%, at least 30%, at least 40%, at least 50%, at least 60%, at most 70%, at most 60%, at most 50%, and/or at most 40%.

Spheroidal void volume 36 of spheroidal void 30 may have and/or define any suitable volume and/or may be within any suitable spheroidal void volume range. Examples of spheroidal void volume 36 include volumes of at least $1\times10^{-7}$ cubic millimeters, at least $5\times10^{-7}$ cubic millimeters, at least $1\times10^{-6}$ cubic millimeters, at least $5\times10^{-6}$ cubic millimeters, at least $1\times10^{-5}$ cubic millimeters, at least $5\times10^{-5}$ cubic millimeters, at least $1\times10^{-4}$ cubic millimeters, at most $1\times10^{-1}$ cubic millimeters, at most $5\times10^{-2}$ cubic millimeters, at most $1\times10^{-2}$ cubic millimeters, at most $5\times10^{-3}$ cubic millimeters, at most $1\times10^{-3}$ cubic millimeters, at most $5\times10^{-4}$ cubic millimeters, at most $1\times10^{-4}$ cubic millimeters, at most $5\times10^{-5}$ cubic millimeters, at most $1\times10^{-5}$ cubic millimeters, and/or at most $1\times10^{-6}$ cubic millimeters. In a specific example, the spheroidal void volume is at least $8.580\times10^{-6}$ cubic millimeters and at most $6.865\times10^{-2}$ cubic millimeters. In another specific example, the spheroidal void volume is at least $8.580\times10^{-6}$ cubic millimeters and at most $6.255\times10^{-3}$ cubic millimeters.

In some examples, and in addition to void-defect coupon 20 that is illustrated in FIG. 1, standards 10 may include a second void-defect coupon 22, as illustrated in FIG. 2. The inclusion of two or more void-defect coupons 20, which may include differently sized defects, within standards 10, may permit and/or facilitate determination of a detection threshold and/or a sensitivity as a function of defect size for void defects for the one or more non-destructive testing methodologies that may be characterized utilizing standards 10.

As illustrated in FIG. 2, second void-defect coupon 22 includes a spheroidal void 30, which also may be referred to herein as a second-coupon spheroidal void 32, and an elongated void 40, which also may be referred to herein as a second-coupon elongated void 42. Second-coupon spheroidal void 32 has and/or defines a maximum dimension 34 and a spheroidal void volume 36. Similarly, second-coupon elongated void 42 has and/or defines a longitudinal dimension 44, which also may be referred to herein as a maximum longitudinal dimension 44 and/or as a maximum dimension 44, a maximum transverse dimension 46, and an elongated void volume 48.

As illustrated in FIG. 2, longitudinal dimension 44 of second-coupon elongated void 42 is greater than maximum dimension 34 of second-coupon spheroidal void 32. In addition, and as also illustrated in FIG. 2, maximum transverse dimension 46 of second-coupon elongated void 42 is less than maximum dimension 34 of second-coupon spheroidal void 32. In addition, and as illustrated by a comparison between FIG. 1 and FIG. 2, spheroidal void volume 36 of second-coupon spheroidal void 32 is greater than spheroidal void volume 36 of first-coupon spheroidal void 31.

Spheroidal void volume 36 of second-coupon spheroidal void 32 may have and/or define any suitable volume and/or may be within any suitable spheroidal void volume range. Examples of spheroidal void volume 36 of second-coupon spheroidal void 32 include volumes of at least $1 \times 10^{-7}$ cubic millimeters, at least $5 \times 10^{-7}$ cubic millimeters, at least $1 \times 10^{-6}$ cubic millimeters, at least $5 \times 10^{-6}$ cubic millimeters, at least $1 \times 10^{-5}$ cubic millimeters, at least $5 \times 10^{-5}$ cubic millimeters, at least $1 \times 10^{-4}$ cubic millimeters, at most $1 \times 10^{-1}$ cubic millimeters, at most $5 \times 10^{-2}$ cubic millimeters, at most $1 \times 10^{-2}$ cubic millimeters, at most $5 \times 10^{-3}$ cubic millimeters, at most $1 \times 10^{-3}$ cubic millimeters, at most $5 \times 10^{-4}$ cubic millimeters, at most $1 \times 10^{-4}$ cubic millimeters, at most $5 \times 10^{-5}$ cubic millimeters, at most $1 \times 10^{-5}$ cubic millimeters, and/or at most $1 \times 10^{-6}$ cubic millimeters. In a specific example, spheroidal void volume 36 of second-coupon spheroidal void 32 is at least $8.580 \times 10^{-6}$ cubic millimeters and at most $6.865 \times 10^{-2}$ cubic millimeters. In another specific example, spheroidal void volume 36 of second-coupon spheroidal void 32 is at least $8.580 \times 10^{-6}$ cubic millimeters and at most $6.255 \times 10^{-3}$ cubic millimeters.

In some examples, elongated void volume 48 of second-coupon elongated void 42 may be greater than elongated void volume 48 of first-coupon elongated void 41. In some examples, elongated void volume 48 of second-coupon elongated void 42 may be less than elongated void volume 48 of first-coupon elongated void 41.

In some examples, and in addition to first void-defect coupon 21 that is illustrated in FIG. 1 and second void-defect coupon 22 that is illustrated in FIG. 2, standards 10 may include a third void-defect coupon 23, as illustrated in FIG. 3. The inclusion of three or more void-defect coupons 20, which may include additional differently sized defects within standards 10 may permit and/or facilitate additional and/or improved determination of the detection threshold and/or the sensitivity as the function of defect size for void defects for the one or more non-destructive testing methodologies that may be characterized utilizing standards 10. Stated differently, the inclusion of a plurality of different void-defect coupons 20, with differing void-defect sizes, within standards 10 may provide additional and/or improved granularity regarding detection thresholds and/or sensitivities for the one or more non-destructive testing methodologies.

As illustrated in FIG. 3, third void-defect coupon 23 includes a spheroidal void 30, which also may be referred to herein as a third-coupon spheroidal void 33, and an elongated void 40, which also may be referred to herein as a third-coupon elongated void 43. Third-coupon spheroidal void 33 has and/or defines a maximum dimension 34 and a spheroidal void volume 36. Similarly, third-coupon elongated void 43 has and/or defines a longitudinal dimension 44, which also may be referred to herein as a maximum longitudinal dimension 44 and/or as a maximum dimension 44, a maximum transverse dimension 46, and an elongated void volume 48.

As illustrated in FIG. 3, longitudinal dimension 44 of third-coupon elongated void 43 is greater than maximum dimension 34 of third-coupon spheroidal void 33. In addition, and as also illustrated in FIG. 3, maximum transverse dimension 46 of third-coupon elongated void 43 is less than maximum dimension 34 of third-coupon spheroidal void 33. In addition, and as illustrated by a comparison between FIG. 2 and FIG. 3, spheroidal void volume 36 of second-coupon spheroidal void 32 is less than spheroidal void volume 36 of third-coupon spheroidal void 33.

Spheroidal void volume 36 of third-coupon spheroidal void 33 may have and/or define any suitable volume and/or may be within any suitable spheroidal void volume range. Examples of spheroidal void volume 36 of third-coupon spheroidal void 33 include volumes of at least $1 \times 10^{-7}$ cubic millimeters, at least $5 \times 10^{-7}$ cubic millimeters, at least $1 \times 10^{-6}$ cubic millimeters, at least $5 \times 10^{-6}$ cubic millimeters, at least $1 \times 10^{-5}$ cubic millimeters, at least $5 \times 10^{-5}$ cubic millimeters, at least $1 \times 10^{-4}$ cubic millimeters, at most $1 \times 10^{-1}$ cubic millimeters, at most $5 \times 10^{-2}$ cubic millimeters, at most $1 \times 10^{-2}$ cubic millimeters, at most $5 \times 10^{-3}$ cubic millimeters, at most $1 \times 10^{-3}$ cubic millimeters, at most $5 \times 10^{-4}$ cubic millimeters, at most $1 \times 10^{-4}$ cubic millimeters, at most $5 \times 10^{-5}$ cubic millimeters, at most $1 \times 10^{-5}$ cubic millimeters, and/or at most $1 \times 10^{-6}$ cubic millimeters. In a specific example, spheroidal void volume 36 of third-coupon spheroidal void 33 is at least $8.580 \times 10^{-6}$ cubic millimeters and at most $6.865 \times 10^{-2}$ cubic millimeters. In another specific example, spheroidal void volume 36 of third-coupon spheroidal void 33 is at least $8.580 \times 10^{-6}$ cubic millimeters and at most $6.255 \times 10^{-3}$ cubic millimeters.

In some examples, elongated void volume 48 of second-coupon elongated void 42 may be greater than elongated void volume 48 of first-coupon elongated void 41 and less than elongated void volume 48 of third-coupon elongated void 43. In some examples, elongated void volume 48 of second-coupon elongated void 42 may be less than elongated void volume 48 of first-coupon elongated void 41 and less than elongated void volume 48 of third-coupon elongated void 43. In some examples, elongated void volume 48 of second-coupon elongated void 42 may be greater than elongated void volume 48 of first-coupon elongated void 41 and greater than elongated void volume 48 of third-coupon elongated void 43.

Figure 4:
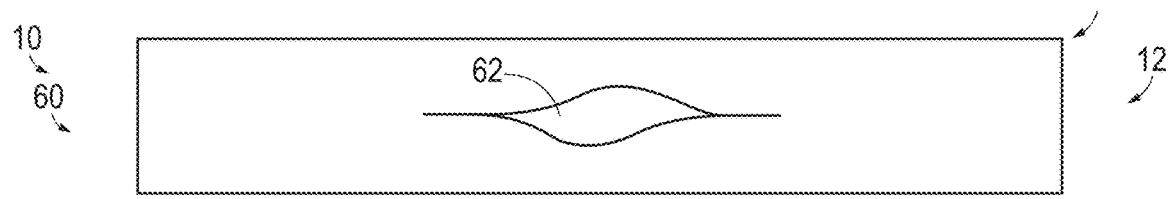
FIG. 4 is a schematic illustration of an example of a kissing-defect coupon that may form a portion of a standard for evaluating non-destructive testing methodologies and fatigue durability performance, according to the present disclosure.
Figure 5:
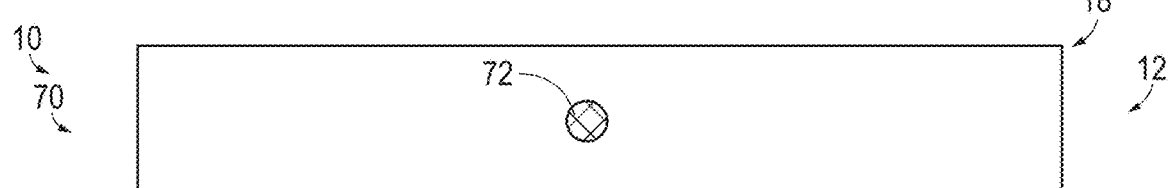
FIG. 5 is a schematic illustration of an example of an inclusion-type-defect coupon that may form a portion of a standard for evaluating non-destructive testing methodologies and fatigue durability performance, according to the present disclosure.
Figure 6:
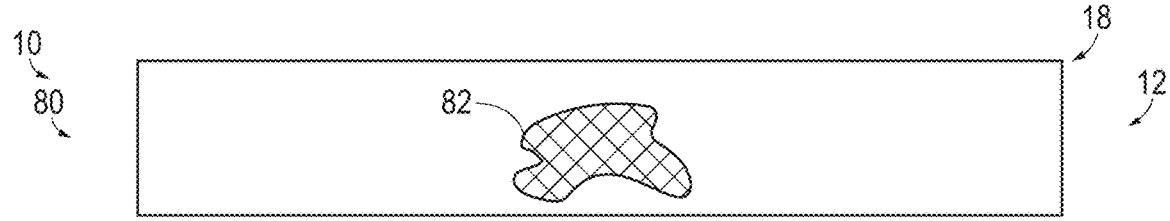
FIG. 6 is a schematic illustration of an example of a phase-difference-defect coupon that may form a portion of a standard for evaluating non-destructive testing methodologies and fatigue durability performance, according to the present disclosure.

It is within the scope of the present disclosure that standards 10 may, in addition to void-defect coupons 20 of FIGS. 1-3, include other coupons 18 that include other defects, or other types of defects. As an example, FIG. 4 is a schematic illustration of an example of a kissing-defect coupon 60 that may form a portion of standards 10, according to the present disclosure. Kissing-defect coupon 60 includes at least one kissing defect 62, such as may be caused by delamination and/or separation of adjacent layers within kissing-defect coupon 60. As another example, FIG. 5 is a schematic illustration of an example of an inclusion-type-defect coupon 70 that may form a portion of standards 10, according to the present disclosure. Inclusion-type-defect coupon 70 includes at least one inclusion-type defect 72, such as may be caused by particulate contamination of a material utilized to form inclusion-type-defect coupon 70. As yet another example, FIG. 6 is a schematic illustration of an example of a phase-difference-defect coupon 80 that may form a portion of standards 10, according to the present disclosure. Phase-difference-defect coupon 80 may include at least one phase-separated region 82, such as may be caused by phase separation of a material utilized to form phase-difference-defect coupon 80.

It is within the scope of the present disclosure that coupons 18, which are disclosed herein, may be formed and/or defined from any suitable material and/or materials. As an example, and such as when coupons 18 are formed utilizing powder metallurgy processes, coupons 18 may be formed from a metal and/or from a metal powder. As additional examples, coupons 18 may be formed from alpha Titanium, beta Titanium, alpha-beta Titanium, and/or Ti-6AL-4V.

It is within the scope of the present disclosure that coupons 18 may have and/or define any suitable shape and/or shapes. In some examples, and as illustrated in FIGS. 1-6, coupons 18 may be parallelepipeds 12. Stated differently, FIGS. 1-6 illustrate flat and/or planar coupons 18, such as may take the form of flat plates.

In some examples, coupons 18 may have a shape that corresponds to a shape of a manufactured component 100 for which coupons 18 may be utilized to quantify the sensitivity of the one or more non-destructive testing methodologies. In such examples, coupons 18 may be referred to herein as having an irregular shape and/or as having a net, or near-net, shape that is based upon, corresponds to, and/or is equivalent to a shape of the corresponding manufactured component 100. Such a configuration may permit and/or facilitate quantification of the sensitivity of the one or more non-destructive testing methodologies to the shape of manufactured components 100, as is discussed in more detail herein.

Figure 7:
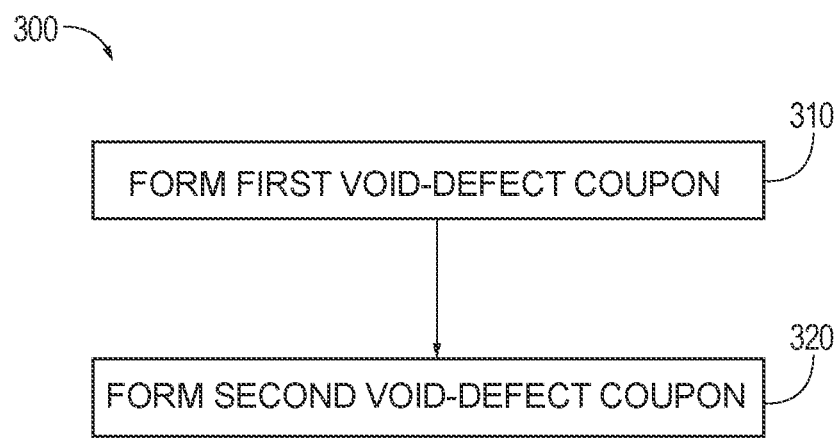
FIG. 7 is a flowchart depicting examples of methods of fabricating a standard for evaluating non-destructive testing methodologies, according to the present disclosure.

FIG. 7 is a flowchart depicting examples of methods 300 of fabricating a standard for evaluating non-destructive testing methodologies, according to the present disclosure. Methods 300 include forming a first void-defect coupon at 310 and forming a second void-defect coupon at 320.

Forming the first void-defect coupon at 310 may include forming the first void-defect coupon utilizing a first powder metallurgy process. The first void-defect coupon includes a first-coupon void that has a maximum dimension and a volume. Examples of the first-coupon void are disclosed herein with reference to first-coupon spheroidal void 31 and/or first-coupon elongated void 41. Examples of the maximum dimension are disclosed herein with reference to maximum dimension 34 and/or longitudinal dimension 44. Examples of the volume are disclosed herein with reference to spheroidal void volume 36 and/or elongated void volume 48.

In some examples, the forming at 310 may include utilizing a metal injection molding process to form the first void-defect coupon. In some examples, the forming at 310 may include utilizing a cold isostatic pressing process to at least partially form the first void-defect coupon. In some examples, the forming at 310 may include utilizing a die pressing process to at least partially form the first void-defect coupon. In some examples, the forming at 310 may include utilizing a powder-bed fusion process to at least partially form the first void-defect coupon. In some examples, the forming at 310 may include utilizing a cold spray process to at least partially form the first void-defect coupon. In some examples, the forming at 310 may include utilizing a thermal spray process to at least partially form the first void-defect coupon.

Forming the second void-defect coupon at 320 may include forming the second void-defect coupon utilizing a second powder metallurgy process. The second void-defect coupon includes a second-coupon void that has a maximum dimension and a volume. Examples of the second-coupon void are disclosed herein with reference to second-coupon spheroidal void 32 and/or second-coupon elongated void 42. Examples of the maximum dimension are disclosed herein with reference to maximum dimension 34 and/or longitudinal dimension 44. Examples of the volume are disclosed herein with reference to spheroidal void volume 36 and/or elongated void volume 48. The maximum dimension of the second-coupon void may be greater than the maximum dimension of the first-coupon void. Additionally or alternatively, the volume of the second-coupon void may be greater than the volume of the first-coupon void.

In some examples, the forming at 320 may include utilizing a metal injection molding process to form the second void-defect coupon. In some examples, the forming at 320 may include utilizing the cold isostatic pressing process to at least partially form the second void-defect coupon. In some examples, the forming at 320 may include utilizing the die pressing process to at least partially form the second void-defect coupon. In some examples, the forming at 320 may include utilizing the powder-bed fusion process to at least partially form the second void-defect coupon. In some examples, the forming at 320 may include utilizing the cold spray process to at least partially form the second void-defect coupon. In some examples, the forming at 320 may include utilizing the thermal spray process to at least partially form the second void-defect coupon.

In some examples, the forming at 310 may include sintering a first unsintered coupon to generate a first sintered coupon and the forming at 320 may include sintering a second unsintered coupon to generate a second sintered coupon. In some such examples, a first sinter time for the sintering the first unsintered coupon may be greater than a second sinter time for the sintering the second unsintered coupon. Additionally or alternatively, and in some such examples, a first sinter temperature for the sintering the first unsintered coupon may be less than a second sinter temperature for the sintering the second unsintered coupon. In some such examples, a first average particle size of particulate metal within the first unsintered coupon is less than a second average particle size of particulate metal within the second unsintered coupon.

In some such examples, the forming at 310 further may include hot isostatic pressing the first sintered coupon to generate a first HIP coupon, and the forming at 320 may include hot isostatic pressing the second sintered coupon to generate a second HIP coupon. In some such examples, a pressing time for the hot isostatic pressing the first sintered coupon may be greater than a pressing time for the hot isostatic pressing the second sintered coupon. Additionally or alternatively, a pressing temperature for the hot isostatic pressing the first sintered coupon may be greater than a pressing temperature for the hot isostatic pressing the second sintered coupon. Additionally or alternatively a pressing pressure for the hot isostatic pressing the first sintered coupon may be greater than a pressing pressure for the hot isostatic pressing the second sintered coupon.

Illustrative, non-exclusive examples of inventive subject matter according to the present disclosure are described in the following enumerated paragraphs:

A1. A standard for evaluating non-destructive testing methodologies and fatigue durability performance, the standard comprising a void-defect coupon that comprises:
  a spheroidal void, having a maximum dimension and a spheroidal void volume; and
  an elongated void, having a longitudinal dimension, a maximum transverse dimension, and an elongated void volume;
  wherein:
    (i) the longitudinal dimension of the elongated void is greater than the maximum dimension of the spheroidal void; and
    (ii) the maximum transverse dimension of the elongated void is less than the maximum dimension of the spheroidal void.

A2. The standard of paragraph A1, wherein the maximum dimension of the spheroidal void is 60% of the longitudinal dimension of the elongated void.

A3. The standard of paragraph A1, wherein the maximum dimension of the spheroidal void is at most 60% of the longitudinal dimension of the elongated void.

A4. The standard of paragraph A1, wherein the maximum dimension of the spheroidal void is at least 60% of the longitudinal dimension of the elongated void.

A5. The standard of paragraph A1, wherein the maximum transverse dimension of the elongated void is 50% of the maximum dimension of the spheroidal void.

A6. The standard of paragraph A1, wherein the maximum transverse dimension of the elongated void is at least 50% of the maximum dimension of the spheroidal void.

A7. The standard of paragraph A1, wherein the maximum transverse dimension of the elongated void is at most 50% of the maximum dimension of the spheroidal void.

A8. The standard of any of paragraphs A1-A7, further comprising a kissing-defect coupon that comprises a kissing defect.

A9. The standard of any of paragraphs A1-A8, further comprising an inclusion-type-defect coupon that comprises an inclusion-type defect.

A10. The standard of any of paragraphs A1-A9, further comprising a phase-difference-defect coupon that comprises a phase-separated region.

A11. The standard of any of paragraphs A1-A10, wherein the void-defect coupon is shaped as a parallelepiped.

A12. The standard of any of paragraphs A1-A11, wherein the void-defect coupon has an irregular shape.

A13. The standard of any of paragraphs A1-A12, wherein the void-defect coupon is made from at least one of: alpha Titanium, beta Titanium, alpha-beta Titanium, and Ti-6AL-4V.

A14. The standard of any of paragraphs A1-A13, wherein the spheroidal void volume of the spheroidal void of the void-defect coupon is at least $8.580 \times 10^{-6}$ cubic millimeters and at most $6.865 \times 10^{-2}$ cubic millimeters.

A15. The standard of any of paragraphs A1-A14, wherein the spheroidal void volume of the spheroidal void of the void-defect coupon is at least $8.580 \times 10^{-6}$ cubic millimeters and at most $6.255 \times 10^{-3}$ cubic millimeters.

A16. The standard of any of paragraphs A1-A15, wherein the void-defect coupon is a first void-defect coupon, and further wherein the standard comprises a second void-defect coupon that comprises:
  a second-coupon spheroidal void, having a maximum dimension and a spheroidal void volume; and
  a second-coupon elongated void, having a longitudinal dimension, a maximum transverse dimension, and an elongated void volume,
  wherein:
  (i) the longitudinal dimension of the second-coupon elongated void is greater than the maximum dimension of the second-coupon spheroidal void;
  (ii) the maximum transverse dimension of the second-coupon elongated void is less than the maximum dimension of the second-coupon spheroidal void; and
  (iii) the spheroidal void volume of the second-coupon spheroidal void is greater than the spheroidal void volume of the spheroidal void of the first void-defect coupon.

A17. The standard of paragraph A16, wherein the spheroidal void volume of the second-coupon spheroidal void is at least $8.580 \times 10^{-6}$ cubic millimeters and at most $6.865 \times 10^{-2}$ cubic millimeters.

A18. The standard of any of paragraphs A16-A17, wherein the spheroidal void volume of the second-coupon spheroidal void is at least $8.580 \times 10^{-6}$ cubic millimeters and at most $6.255 \times 10^{-3}$ cubic millimeters.

A19. The standard of any of paragraphs A16-A18, wherein the elongated void volume of the second-coupon elongated void is greater than the elongated void volume of the elongated void of the first void-defect coupon.

A20. The standard of any of paragraphs A16-A18, wherein the elongated void volume of the second-coupon elongated void is less than the elongated void volume of the elongated void of the first void-defect coupon.

A21. The standard of any of paragraphs A16-A20, further comprising a third void-defect coupon that comprises:
  a third-coupon spheroidal void, having a maximum dimension and a spheroidal void volume; and
  a third-coupon elongated void, having a longitudinal dimension, a maximum transverse dimension, and an elongated void volume,
  wherein:
  (i) the longitudinal dimension of the third-coupon elongated void is greater than the maximum dimension of the third-coupon spheroidal void;
  (ii) the maximum transverse dimension of the third-coupon elongated void is less than the maximum dimension of the third-coupon spheroidal void; and
  (iii) the spheroidal void volume of the second-coupon spheroidal void is greater than the spheroidal void volume of the spheroidal void of the first void-defect coupon and is less than the spheroidal void volume of the third-coupon spheroidal void.

A22. The standard of paragraph A21, wherein the spheroidal void volume of the third-coupon spheroidal void is at least $8.580 \times 10^{-6}$ cubic millimeters and at most $6.865 \times 10^{-2}$ cubic millimeters.

A23. The standard of any of paragraphs A21-A22, wherein the spheroidal void volume of the third-coupon spheroidal void is at least $8.580 \times 10^{-6}$ cubic millimeters and at most $6.255 \times 10^{-3}$ cubic millimeters.

A24. The standard of any of paragraphs A21-A23, wherein the elongated void volume of the second-coupon elongated void is greater than the elongated void volume of the elongated void of the first void-defect coupon and is less than the elongated void volume of the third-coupon elongated void.

A25. The standard of any of paragraphs A21-A23, wherein the elongated void volume of the second-coupon elongated void is less than the elongated void volume of the elongated void of the first void-defect coupon and also is less than the elongated void volume of the third-coupon elongated void.

A26. The standard of any of paragraphs A21-A24, wherein the elongated void volume of the second-coupon elongated void is greater than the elongated void volume of the elongated void of the first void-defect coupon and also is greater than the elongated void volume of the third-coupon elongated void.

B1. A method of fabricating a standard for evaluating non-destructive testing methodologies, the method comprising:
  forming a first void-defect coupon utilizing a first powder metallurgy process, wherein the first void-defect coupon includes a first-coupon void having a maximum dimension and a volume; and
  forming a second void-defect coupon utilizing a second powder metallurgy process, wherein the second void-defect coupon includes a second-coupon void having at least one of a maximum dimension that is greater than the maximum dimension of the first-coupon void and a volume that is greater than the volume of the first-coupon void.

B2. The method of paragraph B1, wherein the forming the first void-defect coupon includes at least one of:
  (i) utilizing a metal injection molding process to form the first void-defect coupon;
  (ii) utilizing a cold isostatic pressing process to at least partially form the first void-defect coupon;
  (iii) utilizing a die pressing process to at least partially form the first void-defect coupon;
  (iv) utilizing a powder-bed fusion process to at least partially form the first void-defect coupon;
  (v) utilizing a cold spray process to at least partially form the first void-defect coupon; and
  (vi) utilizing a thermal spray process to at least partially form the first void-defect coupon.

B3. The method of any of paragraphs B1-B2, wherein the forming the second void-defect coupon includes at least one of:
  (i) utilizing a/the metal injection molding process to at least partially form the second void-defect coupon;
  (ii) utilizing a/the cold isostatic pressing process to at least partially form the second void-defect coupon;
  (iii) utilizing a/the die pressing process to at least partially form the second void-defect coupon;
  (iv) utilizing a/the powder-bed fusion process to at least partially form the second void-defect coupon;
  (v) utilizing a/the cold spray process to at least partially form the second void-defect coupon; and
  (vi) utilizing a/the thermal spray process to at least partially form the second void-defect coupon.

B4. The method of any of paragraphs B1-B3, wherein the forming the first void-defect coupon includes sintering a first unsintered coupon to generate a first sintered coupon, wherein the forming the second void-defect coupon includes sintering a second unsintered coupon to form a second sintered coupon, and further wherein at least one of:
  (i) a first sinter time for the sintering the first unsintered coupon greater than a second sinter time for the sintering the second unsintered coupon; and
  (ii) a first sinter temperature for the sintering the first unsintered coupon is less than a second sinter temperature for the sintering the second unsintered coupon.

B5. The method of paragraph B4, wherein a first average particle size of particulate metal within the first unsintered coupon is less than a second average particle size of particulate metal within the second unsintered coupon.

B6. The method of any of paragraphs B4-B5, wherein the method further includes:
  (i) hot isostatic pressing the first sintered coupon to generate a first HIP coupon; and
  (ii) hot isostatic pressing the second sintered coupon to generate a second HIP coupon.

B7. The method of paragraph B6, wherein at least one of:
  (i) a pressing time for the hot isostatic pressing the first sintered coupon is greater than a pressing time for the hot isostatic pressing the second sintered coupon;
  (ii) a pressing temperature for the hot isostatic pressing the first sintered coupon is greater than a pressing temperature for the hot isostatic pressing the second sintered coupon; and
  (iii) a pressing pressure for the hot isostatic pressing the first sintered coupon is greater than a pressing pressure for the hot isostatic pressing the second sintered coupon.

B8. The method of any of paragraphs B1-B7, wherein the first-coupon void is a first-coupon spheroidal void, and further wherein the second-coupon void is a second-coupon spheroidal void.

B9. The method of any of paragraphs B1-B7, wherein the first-coupon void is a first-coupon elongated void, and further wherein the second-coupon void is a second-coupon elongated void.

B10. The method of any of paragraphs B1-B9, wherein the standard includes any suitable structure, function, and/or feature of any of the standards of any of paragraphs A1-A26.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A standard for evaluating non-destructive testing methodologies and fatigue durability performance, the standard comprising:
    a single void-defect coupon that includes:
    (i) a spheroidal void, having a maximum dimension and a spheroidal void volume; and
    (ii) an elongated void, having a longitudinal dimension, a maximum transverse dimension, and an elongated void volume;
    wherein:
    (i) the longitudinal dimension of the elongated void is greater than the maximum dimension of the spheroidal void; and
    (ii) the maximum transverse dimension of the elongated void is less than the maximum dimension of the spheroidal void;
    wherein the single void-defect coupon is a first single void-defect coupon, and further wherein the standard comprises a second single void-defect coupon that comprises:
    a second-coupon spheroidal void, having a maximum dimension and a spheroidal void volume; and
    a second-coupon elongated void, having a longitudinal dimension, a maximum transverse dimension, and an elongated void volume;
    wherein:
    (i) the longitudinal dimension of the second-coupon elongated void is greater than the maximum dimension of the second-coupon spheroidal void;
    (ii) the maximum transverse dimension of the second-coupon elongated void is less than the maximum dimension of the second-coupon spheroidal void; and
    (iii) the spheroidal void volume of the second-coupon spheroidal void is greater than the spheroidal void volume of the spheroidal void of the first single void-defect coupon.

2. The standard of claim 1, wherein the maximum dimension of the spheroidal void is 60% of the longitudinal dimension of the elongated void.

3. The standard of claim 1, wherein the maximum dimension of the spheroidal void is at most 60% of the longitudinal dimension of the elongated void.

4. The standard of claim 1, wherein the maximum dimension of the spheroidal void is at least 60% of the longitudinal dimension of the elongated void.

5. The standard of claim 1, wherein the maximum transverse dimension of the elongated void is 50% of the maximum dimension of the spheroidal void.

6. The standard of claim 1, wherein the maximum transverse dimension of the elongated void is at least 50% of the maximum dimension of the spheroidal void.

7. The standard of claim 1, wherein the maximum transverse dimension of the elongated void is at most 50% of the maximum dimension of the spheroidal void.

8. The standard of claim 1, wherein the single void-defect coupon is shaped as a parallelepiped.

9. The standard of claim 1, wherein the single void-defect coupon has an irregular shape.

10. The standard of claim 1, wherein the spheroidal void volume of the spheroidal void of the single void-defect coupon is at least $8.580 \times 10^{-6}$ cubic millimeters and at most $6.865 \times 10^{-2}$ cubic millimeters.

11. The standard of claim 1, wherein the spheroidal void volume of the spheroidal void of the single void-defect coupon is at least $8.580 \times 10^{-6}$ cubic millimeters and at most $6.255 \times 10^{-3}$ cubic millimeters.

12. The standard of claim 1, wherein the elongated void volume of the second-coupon elongated void is greater than the elongated void volume of the elongated void of the first single void-defect coupon.

13. The standard of claim 1, wherein the elongated void volume of the second-coupon elongated void is less than the elongated void volume of the elongated void of the first single void-defect coupon.

14. The standard of claim 1, further comprising a third single void-defect coupon that comprises:
    a third-coupon spheroidal void, having a maximum dimension and a spheroidal void volume; and
    a third-coupon elongated void, having a longitudinal dimension, a maximum transverse dimension, and an elongated void volume,
    wherein:
    (i) the longitudinal dimension of the third-coupon elongated void is greater than the maximum dimension of the third-coupon spheroidal void;

(ii) the maximum transverse dimension of the third-coupon elongated void is less than the maximum dimension of the third-coupon spheroidal void; and (iii) the spheroidal void volume of the second-coupon spheroidal void is greater than the spheroidal void volume of the spheroidal void of the first single void-defect coupon and is less than the spheroidal void volume of the third-coupon spheroidal void.

15. The standard of claim 14, wherein the elongated void volume of the second-coupon elongated void is greater than the elongated void volume of the elongated void of the first single void-defect coupon and is less than the elongated void volume of the third-coupon elongated void.

16. The standard of claim 14, wherein the elongated void volume of the second-coupon elongated void is less than the elongated void volume of the elongated void of the first single void-defect coupon and also is less than the elongated void volume of the third-coupon elongated void.

17. The standard of claim 14, wherein the elongated void volume of the second-coupon elongated void is greater than the elongated void volume of the elongated void of the first single void-defect coupon and also is greater than the elongated void volume of the third-coupon elongated void.

18. A method of fabricating the standard of claim 1, the method comprising:

forming the first single void-defect coupon utilizing a first powder metallurgy process, wherein the first single void-defect coupon includes a first-coupon void having a maximum dimension and a volume; and forming the second single void-defect coupon utilizing a second powder metallurgy process, wherein the second single void-defect coupon includes a second-coupon void having at least one of a maximum dimension that is greater than the maximum dimension of the first-coupon void and a volume that is greater than the volume of the first-coupon void.

19. The method of claim 18, wherein the forming the first single void-defect coupon includes sintering a first unsintered coupon to generate a first sintered coupon, wherein the forming the second single void-defect coupon includes sintering a second unsintered coupon to form a second sintered coupon, and further wherein at least one of:

(i) a first sinter time for the sintering the first unsintered coupon is greater than a second sinter time for the sintering the second unsintered coupon; and (ii) a first sinter temperature for the sintering the first unsintered coupon is less than a second sinter temperature for the sintering the second unsintered coupon.

20. The standard of claim 1 further comprising at least one of:

(i) a kissing-defect coupon that comprises a kissing defect;

(ii) an inclusion-type-defect coupon that comprises an inclusion-type defect; and (iii) a phase-difference-defect coupon that comprises a phase-separated region.

* * * * *